United States Patent
Berisha et al.

(10) Patent No.: US 9,657,693 B2
(45) Date of Patent: May 23, 2017

(54) ADSORBER ELEMENT, RING FILTER ELEMENT

(75) Inventors: Bashkim Berisha, Leonberg (DE); Stefan Biba, Besigheim (DE); Hendrik Von Merkatz, Remseck (DE); Birgit Renz, Marbach (DE)

(73) Assignee: Mahle International GmbH (DE)

( * ) Notice: Subject to any disclaimer, the term of this patent is extended or adjusted under 35 U.S.C. 154(b) by 1064 days.

(21) Appl. No.: 13/879,335

(22) PCT Filed: Sep. 29, 2011

(86) PCT No.: PCT/EP2011/066953
§ 371 (c)(1),
(2), (4) Date: Jul. 9, 2013

(87) PCT Pub. No.: WO2012/049027
PCT Pub. Date: Apr. 19, 2012

(65) Prior Publication Data
US 2013/0276633 A1    Oct. 24, 2013

(30) Foreign Application Priority Data
Oct. 13, 2010    (DE) .......... 10 2010 042 424

(51) Int. Cl.
| | |
|---|---|
| *B63G 8/00* | (2006.01) |
| *F02M 35/02* | (2006.01) |
| *B01D 46/00* | (2006.01) |
| *B01D 46/24* | (2006.01) |
| *B01D 53/04* | (2006.01) |
| *F02M 25/08* | (2006.01) |
| *F02M 35/024* | (2006.01) |

(Continued)

(52) U.S. Cl.
CPC ..... *F02M 35/0218* (2013.01); *B01D 46/0036* (2013.01); *B01D 46/0043* (2013.01); *B01D 46/2403* (2013.01); *B01D 53/0407* (2013.01); *F02M 25/08* (2013.01); *F02M 35/024* (2013.01); *F02M 35/046* (2013.01); *F02M 35/10118* (2013.01); *F02M 35/10347* (2013.01); *B01D 2253/102* (2013.01); *B01D 2257/702* (2013.01); *B01D 2279/60* (2013.01)

(58) Field of Classification Search
CPC combination set(s) only.
See application file for complete search history.

(56) References Cited

U.S. PATENT DOCUMENTS

| | | | |
|---|---|---|---|
| 7,655,166 | B2 | 2/2010 | Zulauf et al. |
| 7,895,983 | B2 | 3/2011 | Braithwaite et al. |
| 7,918,912 | B2 | 4/2011 | Tomlin et al. |

(Continued)

FOREIGN PATENT DOCUMENTS

| | | |
|---|---|---|
| DE | 202006007096 U1 | 9/2007 |
| DE | 102009010922 A1 | 11/2009 |

(Continued)

*Primary Examiner* — Duane Smith
*Assistant Examiner* — Adam W Bergfelder
(74) *Attorney, Agent, or Firm* — Fishman Stewart PLLC

(57) ABSTRACT

An annular adsorber element may be used in conjunction with a fresh air system of an internal combustion engine for adsorbing particles such as hydrocarbons. The annular adsorber element may include a support structure and an adsorber material. The support structure may be injection molded onto the adsorber material.

20 Claims, 3 Drawing Sheets

(51) Int. Cl.
*F02M 35/10* (2006.01)
*F02M 35/04* (2006.01)

(56) References Cited

U.S. PATENT DOCUMENTS

| | | |
|---|---|---|
| 2004/0211320 A1* | 10/2004 | Cain ................. B01D 53/0446 96/108 |
| 2005/0005770 A1 | 1/2005 | Dallas et al. |
| 2005/0279201 A1 | 12/2005 | Chang |
| 2007/0113740 A1 | 5/2007 | Oda |
| 2007/0278034 A1 | 12/2007 | Yamaura et al. |

FOREIGN PATENT DOCUMENTS

| | | |
|---|---|---|
| EP | 1818533 A2 | 8/2007 |
| WO | WO-2008/055065 A1 | 5/2008 |

\* cited by examiner

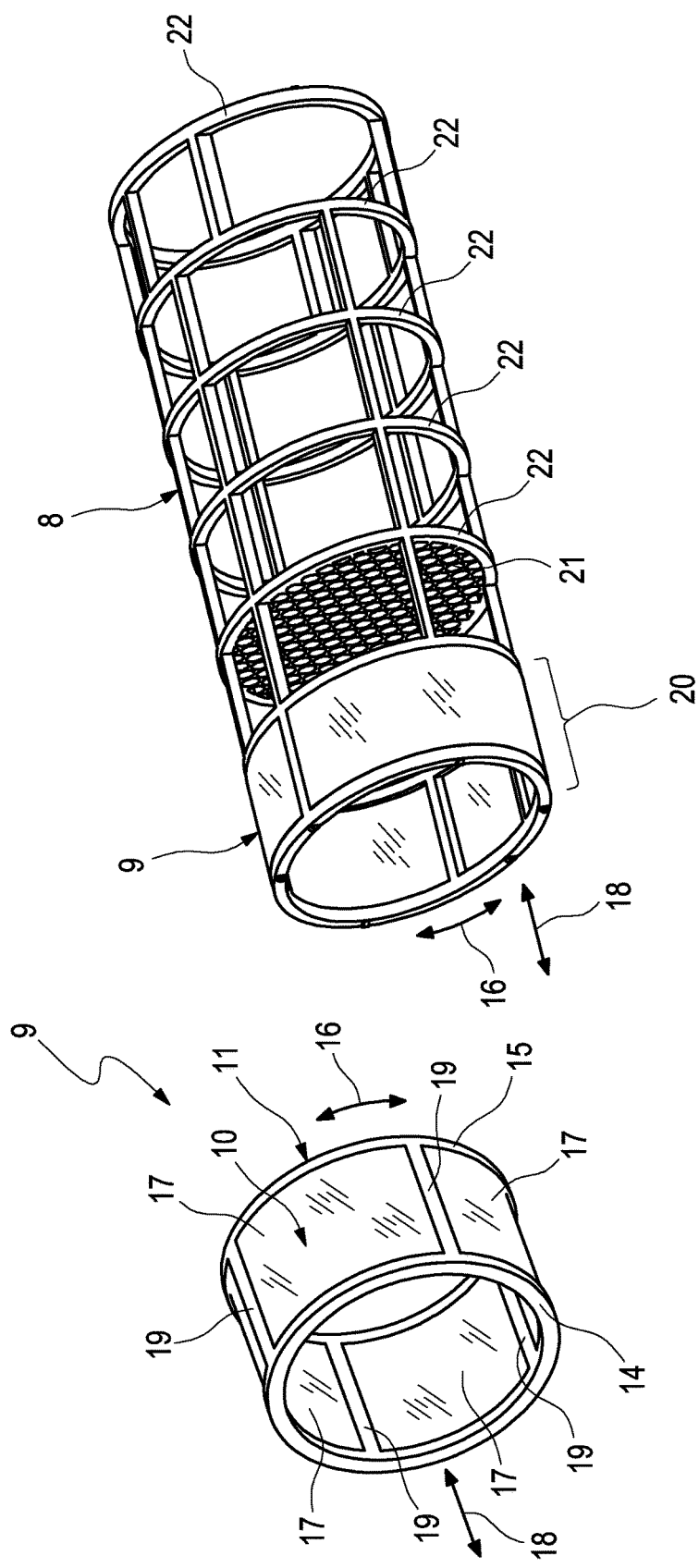

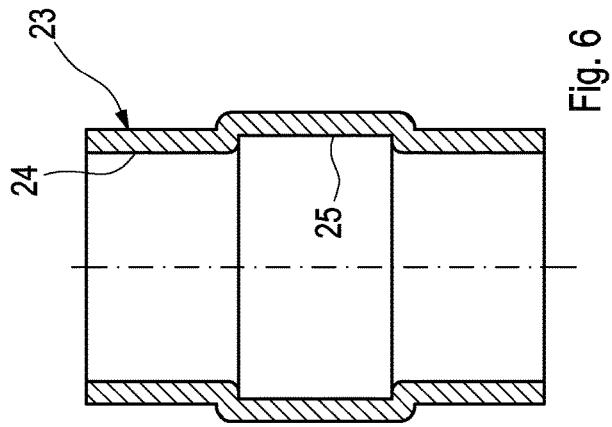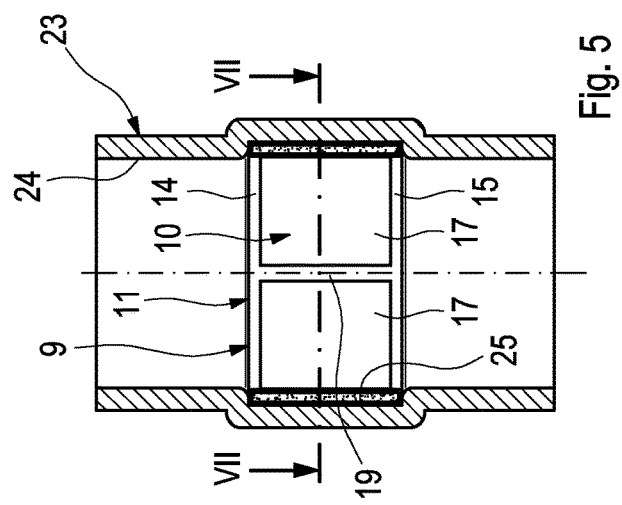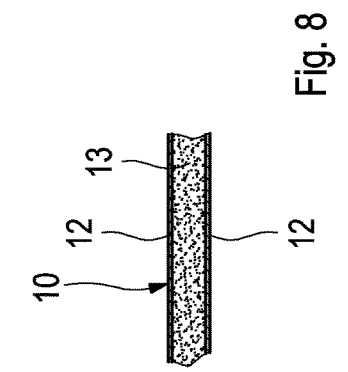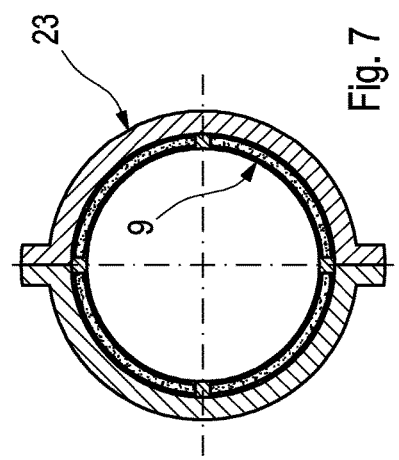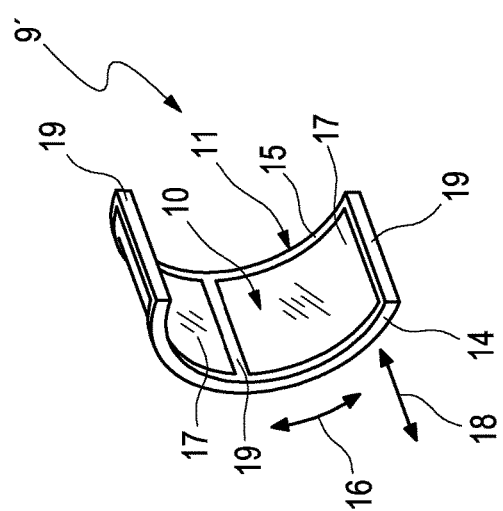

ADSORBER ELEMENT, RING FILTER ELEMENT

CROSS-REFERENCE TO RELATED APPLICATIONS

This application claims priority to German Patent Application 10 2010 042 424.2 filed Oct. 13, 2010, and International Patent Application PCT/EP2011/066953 filed on Sep. 29, 2011, both of which are hereby incorporated by reference in their entirety.

TECHNICAL FIELD

The present invention relates to an annular adsorber element for a fresh air system of an internal combustion engine, in particular of a motor vehicle, for adsorbing hydrocarbons (CHX). Moreover, the invention relates to a ring filter element for an air filter of a fresh air system of an internal combustion engine, in particular of a motor vehicle, comprising such an adsorber element. The invention further relates to an air conveying line for a fresh air system of an internal combustion engine, in particular of a motor vehicle, which air conveying line is provided with such an adsorber element. Finally, the present invention relates also to a method for producing such an adsorber element.

BACKGROUND

From DE 20 2006 007 096 U1, an annular adsorber element is known that is composed of at least two identical adsorber parts and is arranged downstream of an air filter in a fresh air system of an internal combustion engine. For implementing such an adsorber element, a self-supporting adsorber material has been provided, which is comparatively costly.

SUMMARY

The present invention is concerned with the problem of proposing for an adsorber element an improved embodiment that is in particular characterized by inexpensive producibility and enables in particular a simplified integration into other components.

This problem is solved according to the invention by the subject matters of the independent claims. Advantageous embodiments are subject matter of the dependent claims.

The invention is based on the general idea to form the adsorber element by means of an adsorber material onto which a support structure from plastic is injection molded. Through this, a self-supporting adsorber element can be implemented even if the adsorber material used for this is not able of bearing load, since the load-bearing function can largely be assumed by the injection-molded support structure. The support structure can be formed here from a single web or by a plurality of webs. The respective web can extend in the axial or radial direction. Moreover, a spiral arrangement of the respective web is possible. Alternatively or additionally, the support structure can be implemented as a ring. Furthermore, it is possible to connect a plurality of webs or rings to each other so as to generate a stiffer structure. Preferably, the support structure can enclose a circular cross-section wherein, of course, other cross-sections, in particular oval, polygonal or multi-sided cross-sections can also be implemented. This construction according to the invention thus opens up new possibilities for the use of inexpensive adsorption materials in the production of such an annular self-supporting adsorber element. Thus, the adsorber element can be produced in a particularly cost-effective manner. In another configuration of the invention, the adsorber element is adhesively bonded with the support structure, at least in a section. Here, the adhesive bond can form an alternative or additional connection to the injection-molded support structure.

According to a particularly advantageous embodiment, the adsorber material can comprise a single-layer or multilayer sheet material with adsorber medium embedded therein or can be formed by the sheet material and the adsorber medium embedded therein. In this manner, the adsorber material is flexible and can be produced in large amounts. Possible as sheet material are many different fabrics, knitted fabrics or nonwovens, preferably made from plastic. Suitable as an adsorber material is, e.g., carbon or activated carbon. The adsorber medium can be embedded in the sheet material in the form of a free-flowing granulate. For example, the adsorber granulate can be arranged or filled between two layers of the sheet material, the pore size of which is smaller than the average grain size of the granulate.

Injection molding of the plastic for generating the support structure can be carried out according to preferred embodiments in such a manner that at least one of the following features is met. In particular, a plurality of these features or all features can be met at the same time. The adsorber material can extend cylindrically and can define a cylinder having a cylindrical inner contour and a cylindrical outer contour, wherein the injection-molded support structure is integrated in the cylinder. Radially on the inside, the support structure can be flush with the inner contour. Radially on the outside, the support structure can be flush with the outer contour. The support structure can be axially flush with an axial front side of the cylinder or can form the respective axial front side of the cylinder. The support structure can extend radially through the cylinder. The adsorber material can be embedded in the plastic or the support structure.

According to a particularly advantageous embodiment, the adsorber material can be closed on axial front sides by the injection-molded support structure. In particular when using a free-flowing adsorber granulate, extreme simplification is achieved in terms of handling or during the production of the adsorber element if open axial front sides of the adsorber material, through which the adsorber granulate can escape, are closed by the injection-molded support structure in the course of the production of the adsorber element. For example, in the course of the production, the adsorber material can be provided in the shape of sheets and can be cut to the size that is needed in each case for producing the adsorber elements. This cut creates open side edges through which the adsorber medium can escape. In the case of the finished adsorber element, these open lateral edges or rims are then closed by the injection-molded support structure. This applies in particular also for a circumferential joint that can be closed by the injection-molded support structure or can be closed by welding or adhesively bonding the adjoining ends of the adsorber material.

In another embodiment, the adsorber material can be segmented in the circumferential and/or axial direction and can have a plurality of separate adsorber material portions that are closed at their circumferential ends or side edges by the injection-molded support structure. As already mentioned, when cutting the adsorber material provided in the shape of sheets, open edges or rims are created through which the adsorber element can escape. Such rims or edges of the respective adsorber element adjoin each other in the circumferential and/or axial direction. By targeted injection molding of the support structure in such a manner that in the mentioned joint regions the circumferential ends are closed by the injection-molded plastic, escaping of the adsorber medium from the adsorber material can be reduced or prevented completely.

Particularly advantageous here is an embodiment in which at least two or all adsorber material portions are fastened to each other at their circumferential ends by the injection-molded support structure. Through this, not only the individual adsorber material portions, but the entire adsorber element or individual adsorber element parts, which in each case comprise at least two adsorber material portions, are self-supported or stabilized by the injection-molded support structure.

In another embodiment it can be provided that the support structure comprises two rings and a plurality of axial webs which connect the rings to each other. In particular, the rings can close the axial front sides of the annularly arranged adsorber material while the axial webs close said circumferential ends of the adsorber material portions or connect them to each other. Likewise, at least one such axial web can be positioned such that it is fed through a continuous region of the adsorber material and effects there a stabilization or reinforcement of the adsorber material. Overall, by means of the rings connected through the axial webs, the support structure can implement a comparatively high stability for the adsorber element.

According to another advantageous embodiment, the adsorber element can form an integral part of a ring filter element of an air filter of the fresh air system. Preferably, the adsorber element can form an integral part of an internal frame of this ring filter element.

According to a preferred embodiment, the adsorber element can be configured for attaching to the internal frame of the ring filter element. Alternatively, the support structure of the adsorber element can be formed integral on the internal frame of the ring filter element. In particular, the inner frame and the support structure can be injection molded in a common injection mold at the same time or in one piece, respectively.

Alternatively, the adsorber element can also be configured as an integral part of an air conveying line of the fresh air system. For example, the adsorber element can be configured for installation in the air conveying line of the fresh air system. Alternatively, the support structure of the adsorber element can be formed integral in the air conveying line of the fresh air system. Preferably, the support structure and the air conveying line are injection molded in one piece in the same injection mold.

A ring filter element according to the invention that is suitable for an air filter of a fresh air system of an internal combustion engine, in particular of a motor vehicle, has a filter material and an internal frame that supports the filter material radially on the inside. The internal frame is now equipped with such an adsorber element, wherein advantageously, the annular adsorber element is arranged coaxial to the annular internal frame.

Particularly advantageous is an embodiment in which the adsorber element is a separate component with regard to the internal frame and is mounted to the internal frame. Alternatively, the support structure and the internal frame can be made integral from one piece.

In another embodiment, the adsorber element can form an axial portion of the internal frame, which axial portion supports the filter material radially from the inside. Thus, in an axial portion of the ring filter element, the adsorber element assumes the function of the internal frame. Conversely, in such an embodiment, an axial portion of the internal frame assumes the function of the adsorber element. The respective axial portion of the internal frame can preferably be an axial end portion.

According to an advantageous embodiment, the internal frame can have a flow obstruction located axial between the adsorber element and an axial portion of the internal frame adjacent thereto, which flow obstruction impairs the axial flow through the internal frame. Through this, the retention time of the air in the region of the adsorber element can be extended so as to improve the adsorption effect.

Furthermore, it can be provided that the flow obstruction extends over the entire inner cross-section of the internal frame and, for example, is formed by a screen structure or grid structure. In particular, such a flow obstruction can be embedded in the plastic of the internal frame or can be integrally formed thereon. For example, the internal frame can be injection molded together with the flow obstruction and can in particular be injection molded together with the support structure in one piece.

In the case of an air conveying line according to the invention, which is suitable for a fresh air system of an internal combustion engine, in particular of a motor vehicle, at least one such adsorber element can be arranged coaxially on an inner wall. For example, the adsorber element can then be a separate component with regard to the air conveying line that is installed in the air conveying line. However, alternatively, it can also be provided to produce the support structure of the adsorber element and the air conveying line integrally in one piece.

Particularly advantageous is an embodiment in which the adsorber element is arranged radially recessed in the inner wall of the air conveying line. In an embodiment in which the adsorber element is a separate component with regard to the air conveying line, it can be advantageous to configure the adsorber element as at least two pieces and to assemble them only during the installation in the air conveying line. Through this it is in particular possible to insert the adsorber element in a recess formed in the inner wall of the air conveying line if the outer cross-section of the adsorber element is larger than an inner cross-section of the air conveying line.

A method according to the invention for producing such an adsorber element is characterized in that first the adsorber material is inserted into an injection mold and that subsequently the support structure is injection molded onto the adsorber material. In doing so it is principally possible to segment the adsorber material prior to inserting it into the injection mold so that then the separate adsorber material portions can be inserted into the injection mold. In doing so, the adsorber material portions can be inserted into the injection mold in such a manner that their circumferential ends are arranged in regions of the axial webs to be injection molded and are spaced apart from each other in the circumferential direction or adjoin each other. Furthermore, according to a preferred embodiment, the injection mold can be configured such that the support structure and an internal frame of a ring filter element can be injection molded simultaneously in the same injection mold.

Further important features and advantages of the invention arise from the sub-claims, from the drawings, and from the associated description of the figures based on the drawings.

It is to be understood that the above-mentioned features and the features still to be explained hereinafter are not only usable in the respective mentioned combination but also in other combinations or alone without departing from the context of the present invention.

Preferred exemplary embodiments of the invention are illustrated in the drawings and are explained in more detail in the following description, wherein identical reference numbers refer to identical, or similar, or functionally identical components.

BRIEF DESCRIPTION OF THE DRAWINGS

In the figures, schematically,

FIG. 2 shows a perspective side view of an annular adsorber element, FIG. 3 shows a perspective side view of an internal frame of a ring filter element, FIG. 4 shows a perspective view of an adsorber element, FIG. 5 shows a simplified longitudinal section of an air conveying line having an adsorber element in a fresh air system, FIG. 6 shows a longitudinal section as in FIG. 5, but with the adsorber element being removed, FIG. 7 shows a cross-section of the air conveying line in the region of the adsorber element according to the section lines VII in FIG. 5, FIG. 8 shows a greatly simplified cross-section through an adsorber material.

DETAILED DESCRIPTION

Figure 1:
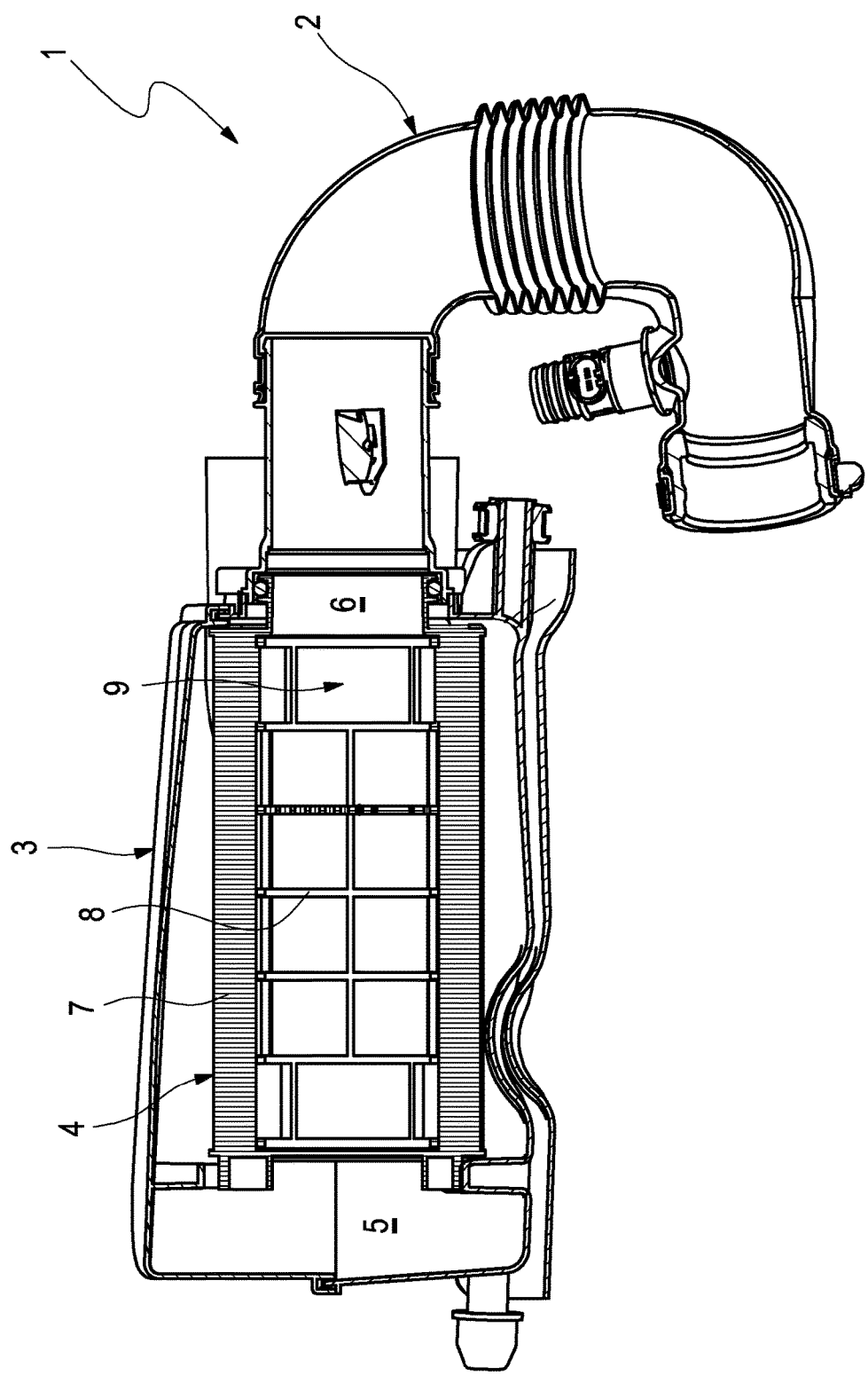
FIG. 1 shows a simplified longitudinal section through an air filter of a fresh air system.

According to FIG. 1, an air filter 1 of a merely partially illustrated fresh air system 2 for supplying fresh air to an internal combustion engine that is preferably accommodated in a motor vehicle comprises in a housing 3 a ring filter element 4 that separates a raw side 5 from a pure side 6. The ring filter element 4 has an annularly arranged filter material 7 and an annular internal frame 8 that is arranged radially on the inside on the filter material 7 so that the filter material 7 can rest radially on the inside against the internal frame 8. The internal frame 8 shown here has an adsorber element 9, with the help of which, e.g., hydrocarbons or, in general, CHX can be adsorbed.

According to the FIGS. 1 to 7, the adsorber element 9 is ring-shaped. It has an annularly arranged adsorber material 10 and a support structure 11 from plastic that is injection molded onto the adsorber material 10. The adsorber material 10 can be a sheet material 12 according to FIG. 8 in which an adsorber medium 13 is embedded. For this, the sheet material 12 can be configured in a single-layered or multi-layered manner. It can be made from a knitted fabric, knotted fabric, fabric or a nonwoven. Preferred is a sheet material from plastic. The adsorber medium 13 is preferably coal or carbon, in particular activated carbon. Here, the adsorber medium 13 can be present as a free-flowing granulate that is suitably embedded in the sheet material 12. For example, the granulate-shaped adsorber medium 13 can be enclosed by the layers of the sheet material 12.

According to the FIGS. 1 to 4, the adsorber material 10 is closed on axial front sides by the injection-molded support structure 11. Since the axial front sides of the adsorber material 10 extend annularly, accordingly, the support structure 11 comprises two rings 14 and 15.

According to the FIGS. 2 to 4, the adsorber material 10 can be segmented in the circumferential direction 16 indicated by a double arrow and, accordingly, can have a plurality of separate adsorber material portions 17. In the example of FIG. 2, four separate segments 17 or adsorber material portions 17 are provided. These adsorber material portions 17 adjoin each other in the circumferential direction 16 with circumferential ends that are closed by the injection-molded support structure 11. Advantageously, said circumferential ends can extend parallel to the axial direction which is indicated by a double arrow and designated by 18. Accordingly, the support structure 11 has axial webs 19 in the region of these circumferential ends. Since the axial webs 19 extend in the axial direction 18 over the entire height of the adsorber element 9, the axial webs 19 connect the two rings 14, 15 to each other. In the example, precisely four axial webs 19 are provided. It is clear that this numerical example is to be understood as not being limiting to generality. Particularly advantageous, it can be provided that at least two of the adsorber material portions 17 are fastened to each other at their circumferential ends by the injection-molded support structure 11, in particular by the respective axial web 19. Likewise, it is principally also possible to form the adsorber material 10 from a strip that extends in the circumferential direction 16 and has only one joint in the circumferential direction 16, which joint can be closed and connected by means of such an axial web 19. Furthermore, also conceivable is a construction in which the sheet material 10 is produced in the shape of a ring and, accordingly, extends without interruption in the circumferential direction 16. In these embodiments too, a plurality of axial webs 19 can be provided which connect the two rings 14, 15 to each other and which, accordingly, are injection molded onto the adsorber material radially on the outside or radially on the inside. Likewise, the plastic of the support structure 11 can be injection-molded onto the adsorber material 10 in such a manner that the plastic penetrates the adsorber material 10 in the region of the axial webs 10 so that in the region of the respective axial web 19, the adsorber material 10 is embedded in the axial web 19.

According to FIG. 2, the adsorber element 9 can form a separate component with regard to the internal frame 8 of the filter element 4. According to the preferred embodiment shown in FIG. 1, this separate adsorber element 9 is then configured in such a manner that it can be mounted on the internal frame 8.

Likewise, according to FIG. 3, it is possible to integrally form the support structure 11 of the adsorber element 9 onto the internal frame 8, as a result of which the adsorber element 9 forms an integral part of the internal frame 8.

According to the FIGS. 1 and 3, the adsorber element 9 is arranged or formed on the internal frame 8 in such a manner that the adsorber element 9 forms an axial portion 20 of the internal frame 8, which axial portion supports a corresponding axial portion of the filter material 7 radially on the inside. In particular, the axial portion 20 of the internal frame 8, which axial portion is formed by the adsorber element 9, can form an axial end section of the internal frame 8.

In the embodiments shown here in the FIGS. 1 and 3, the internal frame 8 is provided with a flow obstruction 21 that is arranged axially between the axial ends of the internal frame 8 and that is arranged outside of or spaced apart from the adsorber element 9. The flow obstruction 21 is configured or arranged here in such a manner that it obstructs the axial flow through the internal frame 8. In particular, as shown here, the flow obstruction 21 can extend over the entire inner cross-section of the internal frame 8. In the example, flow obstruction 21 is formed by a screen structure or grid structure. The flow obstruction 21 extends in a plane that runs transverse to the axial direction 18. In the example, the flow obstruction 21 is formed in the region 21 of a ring 22 of the internal frame 8.

The FIGS. 4 to 7 show another embodiment in which the adsorber element 9 is installed in an air conveying line 23 of the exhaust system 2. Advantageously, this air conveying line 23 is arranged here downstream of the filter 1 or outside of the housing 3 in the fresh air system 2. In another embodiment, which is not shown here, the support structure 11 can be integrally formed on the air conveying line 23.

The adsorber element 9 is installed in the air conveying line 23 in such a manner that it is arranged on an inner wall 24 of the air conveying line 23. Advantageously, the adsorber element 9 extends coaxial to the cylindrical air conveying line 23. For an improved accommodation of the adsorber element 9 in the air conveying line 23, the inner wall 24 can have an annularly, circumferentially extending recess or indentation 25 which is oriented radially to the outside and in which the adsorber element 9 is inserted. On the one hand, this makes it possible to axially fix the adsorber element 9 to the air conveying line 23. On the other, this makes it possible to reduce the flow resistance in the region of the adsorber element 9. Advantageously, the indentation or recess 25 is adapted to the radial depth of the adsorber element 9 in such a manner that the adsorber element 9 is radially recessed in the inner wall 24 and is in particular arranged flush with the inner wall 24. Here, an embodiment is preferred in which an open inner cross-section of the adsorber element 9 has approximately the same size as an open inner cross-section of the air conveying pipe 23 axially next to the recess 25.

According to FIG. 4, for a better accommodation in the air conveying line 23, the adsorber element 9 can be configured to be made from at least two pieces and, accordingly, can comprise at least two adsorber element parts 9', one of which is illustrated in FIG. 4. For example, preferred is an embodiment in two pieces so that the adsorber element part 9' represents one half of an adsorber element 9 or a half shell 9' of the adsorber element 9. When installing, the individual adsorber elements 9' can be inserted individually into the air conveying line 23 so as to form there the complete adsorber element 9.

Producing the adsorber element 9 or the adsorber element parts 9' is advantageously carried out such that first the adsorber material 10 or the adsorber material portions 17 is/are inserted in an injection mold which is not shown here. Subsequently, the support structure 11 is applied on the adsorber material 10 by injection molding. Through this, the rings 14, 15 and the axial webs 19 can form. In particular, the injection mold can also be configured such that the internal frame 8 can also be injection molded therein. In this manner it is in particular possible to injection mold the internal frame 8 and the support structure 11 in one shot, thus with a single injection molding process from the same plastic. Alternatively, a two-shot technique is also possible, wherein first the internal frame 8 and subsequently the support structure 11 is injection molded or vice versa. In the case of the two-shot technique, identical or different plastics can be used for the internal frame 8 and the support structure 11.

The invention claimed is:

1. An annular adsorber element comprising:
a support structure and an adsorber material, wherein the support structure is injection molded onto the adsorber material;
wherein the adsorber material is integral with the support structure and the adsorber material defines a cylinder having a cylindrical inner contour and a cylindrical outer contour; and
wherein the support structure extends radially through the cylinder and penetrates radially through the adsorber material.

2. The adsorber element according to claim 1, wherein the adsorber material includes a sheet material having an adsorber medium embedded therein.

3. The adsorber element according to claim 1, wherein the adsorber material includes at least two material layers and an adsorber medium disposed between the at least two material layers, and wherein the adsorber medium is configured as a free-flowing granulate.

4. The adsorber element according to claim 1, wherein the support structure is radially flush with the inner contour.

5. The adsorber element according to claim 1, wherein the support structure is radially flush with the outer contour.

6. The adsorber element according to claim 1, wherein the support structure is axially flush with an axial front side of the cylinder.

7. The adsorber element according to claim 1, wherein the support structure includes at least two circumferentially extending rings and at least one axially extending web connecting the at least two rings together, and wherein the at least two rings are each disposed on a respective axial end of the adsorber material and the at least one web penetrates radially through the adsorber material from the inner contour to the outer contour.

8. The adsorber element according to any one of the claim 1, wherein the adsorber material is embedded in the plastic of the support structure.

9. The adsorber element according to claim 1, wherein the adsorber material is closed on axial front sides by the support structure.

10. The adsorber element according to claim 1, wherein the adsorber material is segmented in a circumferential direction by the support structure such that the adsorber material defines a plurality of separate adsorber material portions, at least a subset of the separate adsorber material portions being closed at a respective circumferential end by the support structure and at least two of the separate adsorber material portions are fastened together at their respective circumferential ends by the support structure.

11. The adsorber element according to claim 1, wherein the support structure includes a first ring and a second ring and a plurality of axial webs connecting the first ring and the second ring.

12. The adsorber element according to claim 1, wherein the support structure is configured to couple to an internal frame of a ring filter element.

13. A method for producing an adsorber element comprising:
inserting an adsorber material into an injection mold; and
molding a support structure onto the adsorber material such that the adsorber material is integral with the support structure;
wherein the adsorber material defines a cylinder having a cylindrical inner contour and a cylindrical outer contour; and
wherein the support structure extends radially through the cylinder and penetrates radially through the adsorber material.

14. The method according to claim 13, further comprising:

segmenting the adsorber material in a circumferential direction to form a plurality of separate adsorber material portions prior to inserting the adsorber material into the injection mold; and inserting the plurality of adsorber material portions into the injection mold such that the plurality of adsorber material portions are spaced apart at their respective circumferential ends by the support structure such that the support structure includes at least one axial web penetrating radially through the adsorber material from the inner contour to the outer contour.

15. The method according to claim 13, further comprising molding the support structure with an internal frame simultaneously in the same injection mold.

16. The adsorber element according to claim 1, wherein the support structure includes a first ring, a second ring, and a plurality of axial webs connecting the first ring and the second ring together, and wherein the plurality of axial webs penetrate radially through the adsorber material to define a plurality of adsorber material segments enclosed by the support structure.

17. The adsorber element according to claim 2, wherein the sheet material includes at least one of a knitted fabric, a knotted fabric, a nonwoven and a plastic.

18. The adsorber element according to claim 3, wherein the at least two material layers respectively define the inner contour and the outer contour, and wherein the support structure includes at least one axial web penetrating radially through the adsorber material from the inner contour to the outer contour.

19. The adsorber element according to claim 3, wherein the free-flowing granulate includes at least one of coal and activated carbon.

20. The adsorber element according to claim 11, wherein the plurality of axial webs penetrate radially through the adsorber material from the inner contour to the outer contour.

* * * * *